US012798734B2

(12) United States Patent
Bergenwall et al.

(10) Patent No.: US 12,798,734 B2
(45) Date of Patent: Nov. 17, 2026

(54) ANCHOR ASSIST SYSTEM FOR MARINE LEISURE CRAFT

(71) Applicant: CPAC SYSTEMS AB, Gothenburg (SE)

(72) Inventors: Jonatan Bergenwall, Mölndal (SE); Hanna Jonsson, Partille (SE)

(73) Assignee: CPAC SYSTEMS AB, Gothenburg (SE)

( * ) Notice: Subject to any disclaimer, the term of this patent is extended or adjusted under 35 U.S.C. 154(b) by 287 days.

(21) Appl. No.: 18/645,887

(22) Filed: Apr. 25, 2024

(65) Prior Publication Data

US 2024/0367765 A1 Nov. 7, 2024

(30) Foreign Application Priority Data

May 2, 2023 (SE) .................................... 2350524-1

(51) Int. Cl.
*B63B 79/15* (2020.01)
*B63B 21/22* (2006.01)
(Continued)

(52) U.S. Cl.
CPC .............. *B63B 79/15* (2020.01); *B63B 21/22* (2013.01); *B63B 79/40* (2020.01); *G01S 13/865* (2013.01);
(Continued)

(58) Field of Classification Search
CPC ......... B63B 21/00; B63B 21/22; B63B 21/24; B63B 79/00; B63B 79/15; B63B 79/40;
(Continued)

(56) References Cited

U.S. PATENT DOCUMENTS 11,674,806 B2 * 6/2023 Tulgara .................. B63B 79/15 701/431
2007/0073454 A1 3/2007 Kaji et al.
(Continued)

FOREIGN PATENT DOCUMENTS

AU 2008202611 A1 1/2009
EP 4053011 A1 9/2022
(Continued)

OTHER PUBLICATIONS

Swedish Office Action and Search Report in corresponding Swedish Application No. 2350524-1 dated Dec. 5, 2023 (7 pages).
(Continued)

*Primary Examiner* — Lars A Olson
(74) *Attorney, Agent, or Firm* — Jeffri A. Kaminski; Venable LLP

(57) ABSTRACT

A control unit for automatically controlling at least part of an anchoring function of a marine vessel is arranged to obtain a predetermined relationship between keel depth and preferred distance from land for dropping anchor from the storage medium, to receive first sensor data indicative of a current distance between the marine vessel and land, to receive second sensor data indicative of a current keel depth of the marine vessel, to determine a suitable location and/or time period for dropping anchor based on the first sensor data, the second sensor data, and the predetermined relationship between keel depth and preferred distance from land for dropping anchor, and to control at least part of the anchoring function of the marine vessel based on the determined suitable location and/or time period for dropping anchor.

23 Claims, 3 Drawing Sheets

(51) Int. Cl.

| | |
|---|---|
| ***B63B 79/40*** | (2020.01) |
| ***G01S 13/86*** | (2006.01) |
| ***G01S 15/08*** | (2006.01) |
| *B63B 21/00* | (2006.01) |

(52) U.S. Cl.
CPC ......... *G01S 15/08* (2013.01); *B63B 2021/003* (2013.01); *G01S 2205/04* (2020.05)

(58) Field of Classification Search
CPC . B63B 2021/003; G01S 13/865; G01S 15/08; G01S 2205/04
USPC .......................................................... 114/293
See application file for complete search history.

(56) References Cited

U.S. PATENT DOCUMENTS

| | | | |
|---|---|---|---|
| 2013/0269583 | A1 | 10/2013 | Miller |
| 2014/0041569 | A1 | 2/2014 | Couch, III et al. |
| 2018/0099727 | A1 | 4/2018 | Mawson et al. |
| 2019/0155287 | A1 | 5/2019 | Arbuckle et al. |
| 2020/0377177 | A1 | 12/2020 | Mawson et al. |
| 2021/0316827 | A1 | 10/2021 | Sirkin et al. |
| 2021/0347449 | A1 | 11/2021 | Dake et al. |
| 2022/0058957 | A1 | 2/2022 | Rydström |
| 2023/0059445 | A1 | 2/2023 | Lammers-Meis et al. |

FOREIGN PATENT DOCUMENTS

| | | | |
|---|---|---|---|
| IT | 20110062 | A1 | 8/2012 |
| JP | H04252791 | A | 9/1992 |
| WO | 2021140057 | A1 | 7/2021 |

OTHER PUBLICATIONS

Extended European Search Report dated Oct. 21, 2024 in corresponding European Patent Application No. 24173813.7, 8 pages.

* cited by examiner

ANCHOR ASSIST SYSTEM FOR MARINE LEISURE CRAFT

TECHNICAL FIELD

This disclosure relates generally to control systems for marine vessels. In particular aspects, the disclosure relates to an anchor assist system for marine leisure craft and smaller commercial vessels. Although the disclosure may be described with respect to a particular marine vessel type, the disclosure is not restricted to any particular type of boat or ship.

BACKGROUND

Boating can be challenging at times. For instance, when entering a natural harbor or other berthing location many unexpected things can happen which complicate the docking procedure. It is desired to simplify boat maneuvering, especially during docking and in particular docking operations involving anchoring.

SUMMARY

It is an objective of the present disclosure to promote easy boating, and in particular to simplify maneuvers involving anchoring. This object is at least in part obtained by a control unit configured to automatically control at least part of an anchoring function of a marine vessel. The control unit comprises processing circuitry and a storage medium. The control unit is arranged to obtain a predetermined relationship between keel depth and preferred distance from land for dropping anchor from the storage medium. The control unit is also arranged to receive first sensor data and second sensor data, where the first sensor data is indicative of a distance between the marine vessel and land, and the second sensor data is indicative of a keel depth of the marine vessel, i.e., a water depth under the keel of the marine vessel. The control unit is arranged to determine a suitable location and/or time period for dropping anchor based on the first sensor data, the second sensor data, and the predetermined relationship between keel depth and preferred distance from land for dropping anchor. The control unit is also arranged to automatically control at least part of the anchoring function of the marine vessel based on the determined suitable location and/or time period for dropping anchor.

The techniques disclosed herein seek to simplify boating by removing some of the stress on the helmsperson during anchoring maneuvers. The control unit determines what it is time to drop anchor, which means that the helmsperson can focus on maneuvering the vessel instead of on deciding a suitable time period and/or location to drop anchor. The anchoring assist function adapts to both keel depth and distance from land, which is an advantage.

The predetermined relationship may be just a function or look-up table that maps keel depth to preferred distance from land for dropping anchor. However, advantages may be obtained if the predetermined relationship is also a function of present and/or expected water current, sea condition and/or wind condition at the anchoring location, i.e., at the location of the marine vessel. The predetermined relationship may also be a function of seabed properties at the location of the marine vessel. This way the environment at the anchoring location is accounted for when determining the preferred distance from land for dropping anchor, which is an advantage.

According to some other aspects, the predetermined relationship is also configured to account for an anchor dragging distance indicative of a distance along the seabed which the anchor is dragged before it acquires sufficient hold. This anchor dragging distance changes between anchoring locations, and between anchoring maneuvers, and sometimes the dragging distance is significant. It is therefore an advantage that the control unit can be configured to account for dragging distance. The control unit is optionally arranged to monitor anchor dragging distance as function of anchoring location and update the anchor dragging distance accounted for in the predetermined relationship between keel depth and preferred distance from land for dropping anchor based on a current location of the marine vessel. This means that the control unit remembers what the dragging distance was at different anchorages and generates anchor dragging distance statistics for each anchorage. The control unit is then able to adapt over time to tailor the predicted anchor dragging distance to a specific anchorage. Some anchorages where hold is good will then be associated with a relatively short predicted dragging distances while other anchorages where it is more difficult for the anchor to develop sufficient hold on the seabed will have longer predicted anchor dragging distances. The experienced anchor dragging distances over time at one or more anchorages can be shared with other control units implementing similar anchor assist functions. This way a vessel may be in position of historical data related to anchor dragging distance even if the vessel has not visited a given anchorage previously. To summarize, the control unit may be arranged to monitor dragging distance as function of anchoring location, for each anchoring maneuver, and update the anchor dragging distance based on a current location of the vessel to account for historical anchor dragging distance data from the vessel 110 and optionally also from other vessels that have visited a given anchorage.

The first sensor data may comprise data from a lidar and/or a radar sensor on-board the marine vessel which are operable to determine what the environment looks like, where land is, and how far away land is from the vessel. The first sensor data may also comprise sea chart data aligned with the data from the lidar and/or the radar sensor. This means that the lidar and/or radar data can be overlaid on the sea chart in order to identify detections by the lidar and/or radar that correspond to land or a dock and distinguish them from other detections that correspond to other boats and the like.

The second sensor data preferably comprises data from a sonar sensor on-board the marine vessel which measured keel depth in a reliable and efficient manner. The sonar sensor on-board the marine vessel is optionally arranged to generate a depth profile of the seabed over an area under the marine vessel, in order to provide more information regarding the keel depth. The second sensor data may also comprise a position of the vessel obtained from a satellite positioning system, where the control unit is arranged to obtain depth information as function of position from the storage medium, and to determine the current keel depth based on the position of the vessel in combination with the depth information as function of position.

According to some aspects the control unit is arranged to trigger generation of an anchoring signal at the suitable time period for dropping anchor and/or when the marine vessel enters within a predetermined first distance from the suitable location for dropping anchor. The anchoring signal may, e.g., be a sound signal, a light signal, or a tactile signal generated via the helm. The helmsperson and/or crew member operating the anchor thus becomes notified that it is time to let go of the anchor. The control unit may also be arranged to trigger generation of an early notification signal a predetermined time period prior to the suitable time period for dropping anchor. This way the helmsperson or crew member operating the anchor receives an early warning and can get ready for anchoring. The control unit may also be arranged to trigger generation of an early notification signal when the marine vessel enters within a predetermined second distance from the suitable location for dropping anchor, where the predetermined second distance is larger than the predetermined first distance by a margin.

The anchoring signal can also be configured to trigger an automatic anchoring procedure by the marine vessel. An automated anchor windlass may for instance be configured to let the anchor go in response to the anchoring signal, optionally conditioned on prior acknowledgement by an operator of the vessel, such as a helmsperson or a crew member.

The control unit is optionally arranged to receive a signal from a manual input device and to control at least part of the anchoring function of the marine vessel in response to receiving the signal from the manual input device. The manual input device can be operated by the helmsperson of the vessel or by a crew member in order to control the anchoring function in a convenient manner. The manual input device is preferably a portable device arranged to be wirelessly connected to the control unit, such that the person operating the manual input device can move around freely on deck.

The control unit can also be arranged to receive a force signal from a force sensor arranged in connection to the anchor rode or anchor windlass of the marine vessel, and to determine when the anchor has acquired sufficient hold at the bottom based on the force signal. The force sensor may, e.g., be realized as a load cell or as a linear position transducer arranged in connection to a resilient element such as a spring or the like. The force signal measured the load on the anchor rode, i.e., how much force that the anchor resists. The force sensor can therefore be used to determine when the anchor is able to resist enough force, i.e., when the vessel is safely anchored to the bottom. The control unit may furthermore be arranged to validate an anchor hold based on the force signal and on an anchor hold acceptance criterion, and to trigger an action in case the force signal does not satisfy the anchor hold acceptance criterion. The control unit may, e.g., perform an automated pull test after anchoring. The pull test comprises a temporary generation of forward thrust and simultaneous monitoring of the force signal. The control unit may then validate the anchor hold in case the force signal in response to the temporary forward thrust satisfies the anchor hold acceptance criterion, and invalidate the anchor hold otherwise. This ensures that the vessel is safely anchored at the anchorage.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
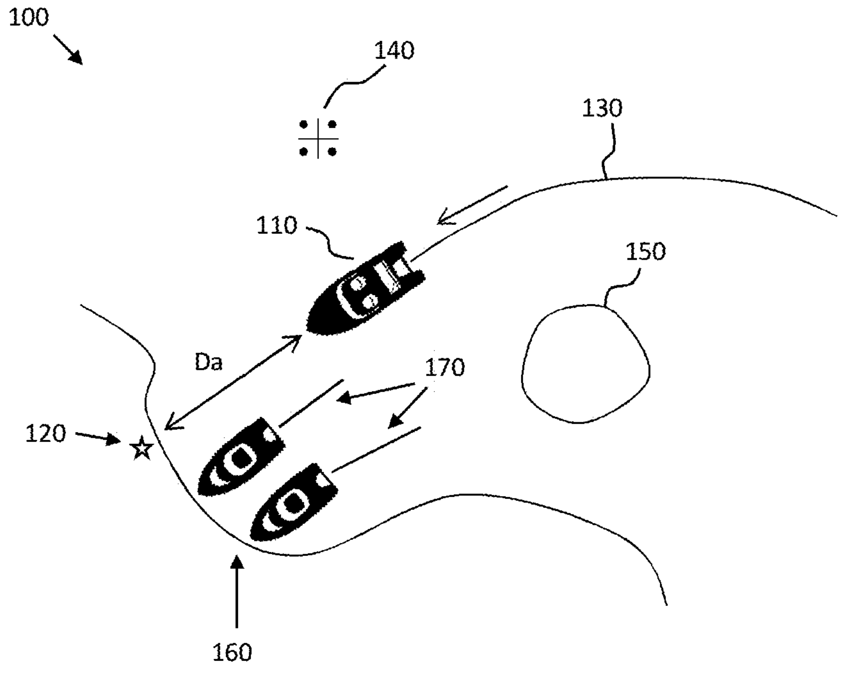
FIG. 1 illustrates an example docking scenario.

FIG. 1 illustrates an example docking scenario 100 where a marine vessel 110, here a marine leisure craft, is entering a natural harbor area. It is desired to dock the boat 110 with the bow against land at location 120, with an anchor rode leading aft from the stern of the boat 110. The navigation 130 into the natural harbor is challenging due to the presence of obstacles such as shoals 140 and smaller islets 150. A number of other boats 160 are already moored at the location with respective stern anchor rodes 170 to be avoided. The anchorage may be in a lake or along the sea coastline.

To dock the boat 110, the helmsperson must successfully navigate towards the location 120, and then drop anchor at a suitable anchoring distance Da from land. A crew member is not always available to assist, and it may be prohibitively challenging to handle so many tasks at once. There is a risk that the anchor rode, or anchor cable runs out before the boat reaches land in case the anchor is dropped too far from land, and the anchor cannot be dropped too close to land since then the anchor hold on the sea bottom may not have time to develop. The anchor rode should preferably have sufficient angle relative the sea surface also, such that other boats do not risk getting caught on the anchor cable. A berthing situation like that in FIG. 1 can be challenging to a helmsperson, especially an inexperienced helmsperson without assistance from experienced crew members.

The present disclosure relates to an anchor assist system which automatically determines a suitable time period and/or a suitable location, such as an area or a range of distances from land, at which to drop anchor during a docking maneuver like that illustrated in FIG. 1. The suitable time period may be on the order of a few seconds or minutes but can also be relatively short in which case the time period can instead be referred to as a time instant. The systems and methods disclosed herein comprise a pre-configured relationship between keel depth (i.e., the water depth at the location of the vessel) and suitable distance from land at which to drop anchor. This relationship or function allows for mapping a measured keel depth into a suitable anchoring location relative to land or a range of suitable distances from land at which to drop anchor. The suitable anchoring location may, e.g., be defined by a center point and a radius, or a polygon shape, or by some other region. An exact preferred anchoring location is also possible, i.e., a point.

The range of suitable distances from land at which to drop anchor may be defined as a preferred distance with a span of ranges around the preferred distance that are also acceptable distances from land at which to drop anchor. The suitable anchoring location relative to land may also be associated with a preference scale, such as a falling scale of preference from a preferred exact location that decreases with distance from the preferred anchoring spot. This preference can be indicated to the helmsperson or crew member in charge of anchoring on a display or the like. The person will then see a rising indication of preference as the vessel approaches land up to a point where the preference again starts to decline.

The anchor assist system disclosed herein uses on-board sensors to detect a remaining distance to land, and also on-board sensors that determine current keel depth of the boat 110. This data allows the anchor assist system to determine when and/or where to drop anchor. The helmsperson does not need to worry about deciding where to drop anchor and can instead focus on handling the boat during the berthing maneuver. The anchor assist system optionally also accounts for an anchor dragging distance on the sea floor, i.e., the predicted distance the anchor is dragged on the bottom before it develops sufficient anchor hold, i.e., a sufficiently strong grip by the anchor on the bottom of the sea or lake.

Figure 2:
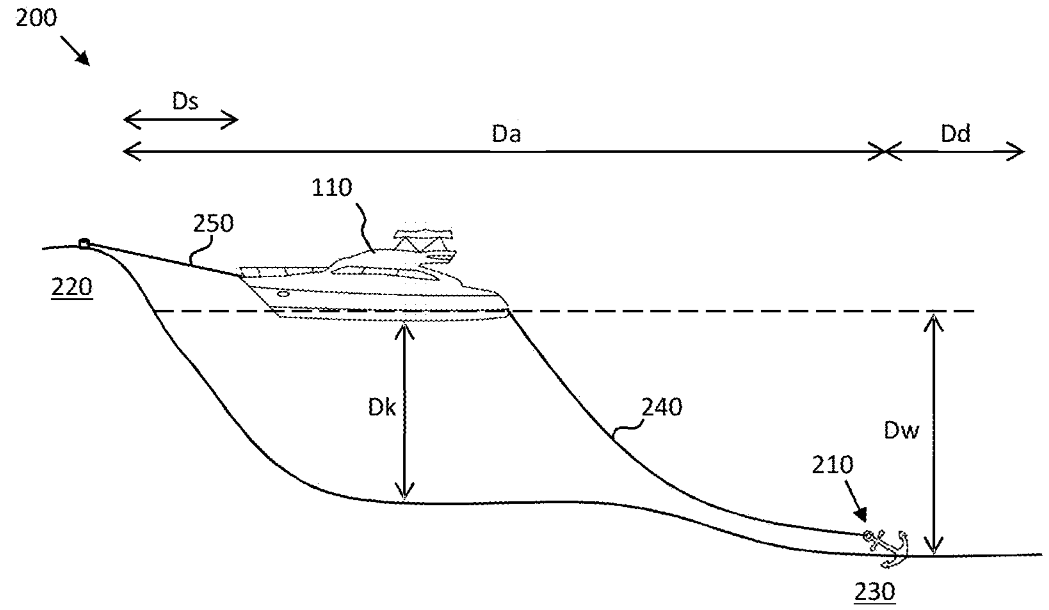
FIG. 2 shows a boat moored with the bow towards land and a stern anchor.

FIG. 2 shows an example 200 of a vessel 110 that has been moored with its bow towards land. An anchor 210 has been dropped a distance Da from land 220 at an anchoring depth Dw. There is a preferred relation between the distance Da from land 220 and the anchoring depth Dw which can be pre-configured, i.e., determined beforehand. The preferred distance from land for dropping anchor generally increases with anchoring depth Dw since a relatively acute angle is desired between anchor rode 240 and seabed 230. It is also desired to provide enough dragging distance Dd over which the anchor can be dragged across the sea floor before it acquires sufficient hold. The dragging distance is normally a function of the type of anchor and the properties of the seabed, i.e., if the seabed is soft such as sand or mud, or hard such as rock or gravel. The dragging distance can also be preconfigured and will add to the preferred distance from land for dropping anchor. I.e., if the preferred distance from the anchor location to land is Da, and the estimated dragging distance before sufficient anchor hold is developed is Dd, then the preferred distance from land for dropping anchor is Da+Dd. The dragging distance may be a fixed distance, or a variable distance that is a function of the type of seabed (sand, mud, rock, gravel, etc.) and the type of anchor that the boat carries.

Aspects of the proposed anchor assist systems discussed herein also comprise functionality that validates anchor hold and triggers an action in case an acceptable anchor hold has not developed, i.e., if the anchor has not acquired sufficient grip on the seabed. These functions will be discussed in more detail below.

The term "land" is to be construed broadly herein to mean any type of object that can support the boat at least temporarily in addition to the anchor. Land can mean a section of shoreline in a natural harbor, such as a rock or section of beach, against which the boat can moor with a stern line and/or with a bow line. Land can also mean a dock or jetty against which the boat can be moored with stern and bow towards the dock or jetty. A mooring buoy may also be referred to as land in some cases. A floating dock may also be referred to as land herein, since it fundamentally fulfills the same mooring purpose in holding the boat in position at least temporarily.

The preferred distance Da from land at which to drop the anchor can be determined as a function of the anchoring depth Dw, e.g., as a look-up table (LUT) or analytic function that has been preconfigured by the anchor assist system. The preferred distance Da from land at which to drop the anchor can also be dependent on one or more additional parameters, as will be discussed in the following. The preferred length or length interval of the bowline 250 for instance, or the preferred mooring distance or mooring distance range from land may be accounted for when determining the preferred distance Da from land at which to drop the anchor. A decreasing scale of preference can also be used which declines according to a predetermined function from a preferred length of bowline and/or from a preferred mooring distance to less preferred bowline lengths and/or less preferred mooring distances. This function can be linear or non-linear.

The preferred distance Da from land at which to drop the anchor advantageously depends on several parameters such as the type of seabed 230, e.g., if the seabed is primarily sand, gravel, mud, or stones. The seabed properties can be determined from a database, such as a sea chart, or estimated based on sensor signals such as sonar. A longer length of anchor rode 240 is preferred in case the seabed properties are associated with less reliable anchor hold. Weather conditions may also impact the preferred distance from land at which to drop the anchor. Generally, bad weather, i.e., high winds, strong current, and/or high waves, calls for longer distances Da and the anchor will have to withstand higher loads as the boat can be expected to pull harder on the anchor rode.

Figure 3:
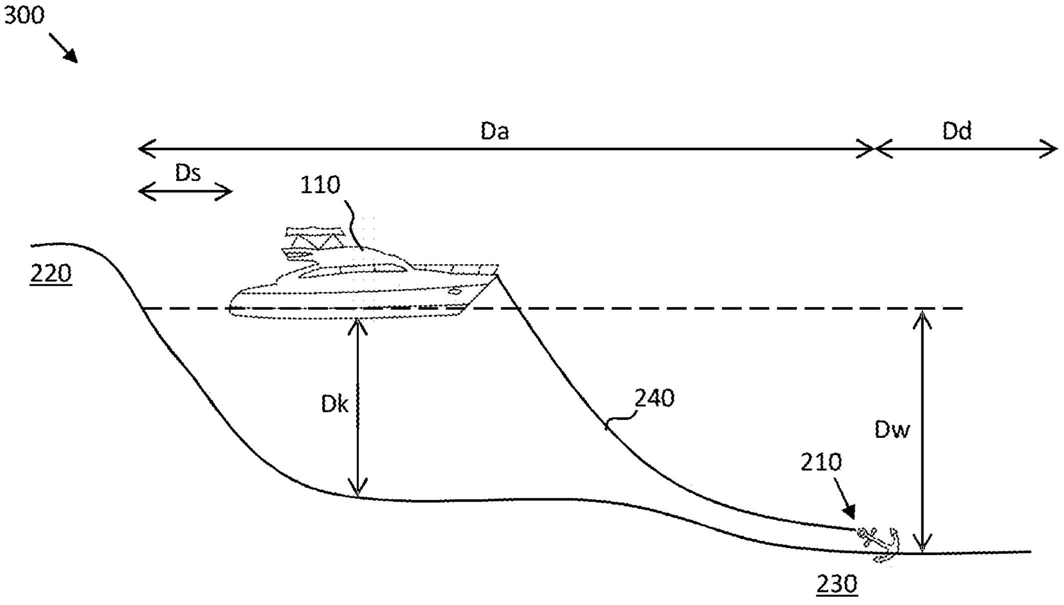
FIG. 3 shows a boat at anchor.

FIG. 3 shows an example 300 of a boat at anchor, where no bow line or stern line to land is present. Similar considerations for when to drop the anchor 210 apply here as in the example scenario 200 in FIG. 2. It is important that the anchor is dropped at sufficient distance Da from land in order to ensure that the necessary anchor rode length can be deployed without the boat 110 ending up too close to shore, i.e., that the distance Ds from the vessel 110 to shore 220 is acceptable after the required length of anchor rode 220 has been deployed. Again, a relationship between anchoring depth Dw and preferred distance Da (or preferred distance range) from land at which to drop the anchor can be pre-configured and used to determine a suitable time period and/or location for dropping anchor. An estimated dragging length Dd may also be accounted for by the system, as discussed above.

Figure 4:
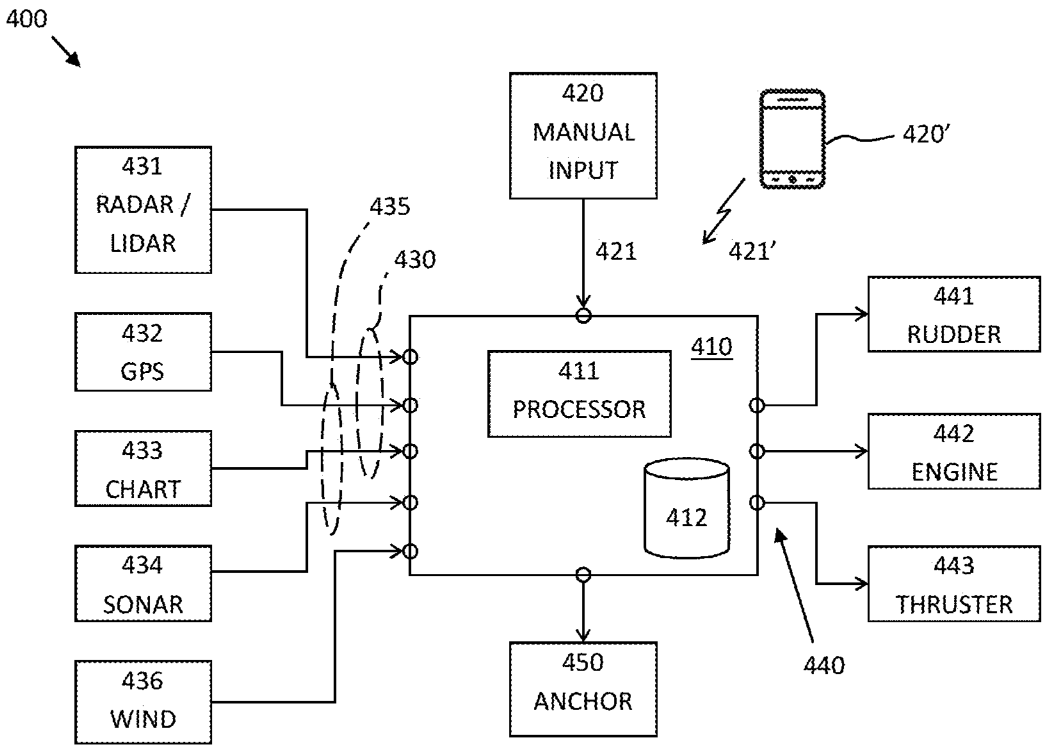
FIG. 4 schematically illustrates a control system comprising a control unit.

FIG. 4 schematically illustrates a control system 400 for performing at least some of the anchor assist functions discussed above. The system comprises a control unit 410 for controlling an anchoring function 450 of the marine vessel 110. This anchoring function can be a simple function such as a notification signal or a more advanced function such as an automated anchoring function involving a motorized windlass. The control unit 410 comprises processing circuitry 411 and a storage medium 412. An example computer system 600 that can be used to realize the different functions discussed herein will be discussed below in connection to FIG. 6.

One or more sensor systems are connected to the control unit 410 for obtaining information about the surrounding environment of the vessel 110. A radar sensor and/or a lidar sensor 431 can be used by the control unit 410 to obtain information about objects in vicinity of the vessel 110, in particular the distance Ds between the vessel 110 and shore, a dock or a jetty 220 as it approaches the anchorage. It may be advantageous to pre-process the lidar data and/or the radar data in order to identify objects in vicinity of the vessel 110, and to classify the detected objects. This type of pre-processing of lidar and/or radar data is often referred to as segmenting. The segmentation can be used to distinguish detected objects corresponding to land from other objects such as other boats. The system can then determine the preferred anchoring location based on the detection of land and not based on the detection of other objects. This way the lidar and/or radar detections that correspond to land 220 can be identified, and the distance from the vessel 110 to land can be determined in a more reliable manner. Segmenting of lidar data and/or segmenting of radar data is generally known and will therefore not be discussed in more detail herein.

Both the radar data and the lidar data can be complemented by vessel position data from a satellite positioning system receiver 432, such as a global positioning system (GPS) receiver or the like, in combination with sea chart data 433 obtained from an on-board or an off-board database. The sea chart data is not really a sensor input signal per se, but the combination of position data from a GPS sensor 432 and sea chart data that indicates where the shoreline is can be considered a sensor that provides information about the distance Ds between the vessel 110 and shore 220 as well as depth information indicative of a keel depth at the current vessel position.

A depth sensor 434, such as a sonar sensor, can be used to obtain depth data in a reliable manner, i.e., the current keel depth Dk of the marine vessel 110 indicated in FIG. 2 and in FIG. 3. Some sonar sensors provide keel depth over a range of angles relative to a vertical axis, normally in longitudinal direction, i.e., a bit in front and behind the vessel 110 to generate a depth contour image of the bottom over an area under the vessel 110. Thus, according to some aspects, the sonar sensor 434 on-board the marine vessel 110 is arranged to generate a depth profile of the seabed over an area under the marine vessel 110.

A wind sensor 436 can provide information about the weather conditions, i.e., the wind speed and the wind direction. Weather report data indicative of current and future weather conditions at an anchorage can be obtained from a remote server or the like.

Sea current can be monitored using various sensors, such as logs. Also, some boats comprise advanced motion support control systems that are operable to keep the vessel stationary or move the vessel according to a pre-programmed path. The effort required to keep the boat stationary or on the path can be used as measure of sea current direction and magnitude.

The control unit 410 is, as mentioned above, arranged to obtain a predetermined relationship between keel depth and preferred distance from land for dropping anchor from the storage medium 412. This relationship may, e.g., be stored as a look-up table (LUT) which can be indexed by the current measured keel depth to obtain the preferred distance from land at which the anchor is to be dropped. An analytical function can also be used, which maps depth into preferred distance from land for dropping anchor. This relationship is normally non-decreasing, and often increasing, i.e., the larger the depth the longer from land the anchor is preferably dropped and vice versa. The relationship may also comprise a depth limit which indicates the largest anchoring depth for the vessel 110. Anchoring at depths beyond this depth limit will most likely not be successful, e.g., since the anchor rode on the boat is not sufficiently long to support anchoring at depths larger than the depth limit. The predetermined relationship can be determined from practical experimentation, and can be configured as function of the type of anchor on the vessel 110, i.e., if the vessel carries a Danforth anchor, a CQR anchor, a Bruce anchor, etc. The relationship can also at least in part be determined based on the type of vessel 110, e.g., the weight of the vessel 110.

According to some aspects the predetermined relationship is a function of present and/or expected water current condition, sea condition and/or wind condition at a location of the marine vessel 110 and/or at the anchorage. The weather conditions determine how strong anchor hold that is required for a safe berthing. If weather conditions are expected to be unfavorable, i.e., if high winds are expected, then the preferred distance from land for dropping anchor is preferably increased compared to if weather conditions are more calm. The predetermined relationship can also be configured as a function of seabed properties at the location of the marine vessel 110. Some seabed properties are better for anchoring than others. The seabed properties at the anchoring location can be obtained from sea chart data 433 in combination with position data which can be obtained, e.g., from the GPS system 432. The seabed properties also affect the expected anchor dragging distance, which in turn has an effect on the preferred distance from land for dropping anchor, as will be discussed in more detail below.

The control unit 410 is arranged to receive first sensor data 430 indicative of a current distance Ds between the marine vessel 110 and land 220, as well as second sensor data 435 indicative of a current keel depth Dk of the marine vessel 110. The control unit 410 can now determine a suitable location and/or time period for dropping anchor based on the first sensor data 430, the second sensor data 435, and the predetermined relationship between keel depth and preferred distance from land for dropping anchor. Thus, the control unit 410 monitors the current keel depth Dk of the marine vessel 110 and translates this depth into a preferred distance to land for dropping anchor. This preferred distance is then compared to the actual distance to land, as indicated by the second sensor data. When the current distance matches the preferred distance, the control unit determines that a suitable location has been reached and/or that it is time to drop the anchor. It is an advantage that the actual distance to land is determined from an on-board sensor and not estimated by the helmsperson or crew member in charge of anchoring, both since a more reliable distance is obtained and also since the distance can be determined also when sight conditions are poor, e.g., at night or in fog.

The control unit 410 is arranged to control at least part of the anchoring function of the marine vessel 110 based on the determined suitable location and/or time period for dropping anchor, this may entail triggering a notification to one or more persons on the vessel 110 or activating an automatic anchoring mechanism 450 on the vessel 110. The notification may involve a message on a display at the helm, or an audible notification signal. The notification may also involve activating a dedicated anchor notification light. The notification signal may also be configured to indicate a distance remaining to the suitable anchoring location and/or a remaining time period until a suitable anchoring time. The notification can be shown to the helmsperson or crew member as an area on a sea chart, or as a contour plot overlaid on a sea chart where preference is indicated. The helmsperson or crew member can then see where anchoring is preferred, and also where anchoring is acceptable.

Generally, a cost function can be formulated based on various metrics for selecting the best candidate location relative to shore or a dock for dropping anchor. This cost function may take the form of $$C_i = \sum_{k=1}^{N} w_k c_k$$

where $C_i$ is the total cost associated with the i-th candidate location $L_i$. The cost function comprises N different metrics. Some example metrics comprise: Vessel speed over ground (SOG) and/or vessel speed through water (STW), water current, wind, boat characteristics, type of anchor, distance to obstacles in vicinity of the anchoring location, presence of other boats, and so on.

With continued reference to FIG. 4, the control unit 410 may have one or more actuators at its disposal for controlling the vessel 110. Most vessels will comprise a rudder 441 for steering the vessel, and an engine 442 for powering the vessel. However, some vessels also comprise thrusters 443 which may improve the maneuverability of the vessel, especially in tight spaces where there is not very much room for maneuvering. According to some aspects, the control unit 410 is arranged to automatically navigate the vessel 110 along a path from the location the anchor was dropped towards shore, by generating control commands for one or more out of the rudder 441, the engine 442 and/or the one or more thrusters 443. The control unit 410 may also be arranged to maintain a location of the vessel 110 as the anchor is dropped, giving the person operating the anchor sufficient time to successfully deploy the anchor. Systems for keeping a marine vessel in position are generally known and will therefore not be discussed in more detail herein. The control unit 410 may of course assist in anchoring also during maneuvers where the boat remains in motion during the maneuver. The control unit 410 may for instance be arranged to maintain motion by the vessel 110 along some predetermined path, at a set speed, while dropping anchor.

The first sensor data 430 may comprise data from a lidar and/or a radar sensor 431 on-board the marine vessel 110. Radar sensors and lidar sensors generate a perception of the surroundings of the vessel 110, which can be used to determine a distance from the vessel 110 to shore. The radar and/or lidar data can also be segmented, which means that the detections are grouped together and classified. This way the position of the shoreline, a dock, a buoy, or some other mooring location, relative to the vessel can be determined in a more reliable manner.

The first sensor data 430 may also comprise sea chart data aligned with the data from the lidar and/or the radar sensor 431. The sea chart data can, for instance, be overlaid on the radar data and used to detect the location of the shoreline in the radar data and/or in the lidar data. This way objects in vicinity of the vessel 110 can be separated from the shoreline, which is an advantage. The other vessels 160 in FIG. 1 can, for instance, be distinguished from the shoreline. Segmentation of the radar data and/or segmentation of the lidar data can be improved by making use of sea chart data.

The second sensor data 435 preferably comprises data from a sonar sensor 434 on-board the marine vessel 110. Sonar sensors provide reliable information about the current depth, and sometimes also the depth a distance in front of the vessel 110, or the depth over an area under the boat, as noted above. Sonar sensors are generally known and will therefore not be discussed in more detail herein.

The second sensor data may also comprise a position of the vessel 110 obtained from a satellite positioning system such as the GPS receiver 432. The control unit 410 can then obtain depth information as function of position from the storage medium 412 and determine the current keel depth Dk based on the position of the vessel 110 in combination with the depth information as function of position. The depth information as function of position obtained from the storage medium 412 can be regular sea chart data or some other form of formatted depth information.

The control unit 410 is, according to some aspects, arranged to trigger generation of an anchoring signal at the suitable time period for dropping anchor and/or when the marine vessel 110 enters within a predetermined first distance from the suitable location for dropping anchor. The anchoring signal can for instance be a signal that is configured to trigger an automatic anchoring procedure by the marine vessel 110, i.e., an automatic windlass control that releases the anchor automatically in response to the anchoring signal. This type of automatic anchoring procedure by the marine vessel 110 is preferably conditioned on prior acknowledgement by an operator of the vessel 110. Hence, according to an example, when the vessel reaches the anchoring location, a message is generated asking the helmsperson or anchor operator to acknowledge that the anchor is to be released. The anchor is then only released in case the helmsperson or anchor operator provides the acknowledgement.

The control unit 410 can also be arranged to receive a signal from a manual input device 420, and to control at least part of the anchoring function of the marine vessel 110 in response to receiving the signal from the manual input device 420. The manual input device may be configured to control an anchor windlass. The input device may be a manual input device 420 operable from a position on-board the vessel 410. The input device may also be realized as a menu choice in an existing navigation system interface on the vessel. For instance, the vessel 110 may comprise a display located in connection to the helm of the vessel for displaying, e.g., sea charts, radar images, lidar images, and the like. This display may comprise a touch-screen function.

The input device can also be a portable device 420' arranged to be wirelessly connected to the control unit 410. This portable device 420' may be realized as a relatively simple remote control device which transmits a radio signal to a radio receiver arranged on the vessel. The portable device 420' may also be a smartphone or other device which connects to the control unit 410 via wireless link, such as a Wi-Fi link in the family of wireless network protocols based on the IEEE 802.11 family of standards, a Bluetooth wireless link, or the like.

According to some aspects, the control unit 410 is arranged to trigger generation of an early notification signal a predetermined time period prior to the suitable time period for dropping anchor. This gives the helmsperson and/or crewmember and other persons on-board the vessel an early warning, informing them that a suitable location for anchoring is coming up. This way any preparations for anchoring can be completed in time before the anchoring location is reached. The control unit 410 may for instance be arranged to trigger generation of the early notification signal when the marine vessel 110 enters within a predetermined second distance from the suitable location for dropping anchor, where the predetermined second distance is larger than the predetermined first distance by a margin.

Figure 5A:
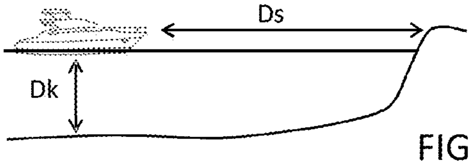
FIGS. 5A-D show an example sequence of events during docking.

FIGS. 5A-D show an example anchoring maneuver using the proposed anchor assist system. In FIG. 5A a boat approaches an anchoring location. The boat uses one or more onboard sensors, such as a lidar and/or a radar to monitor the remaining distance Ds to land. The boat also monitors the current depth Dk under the keel, possibly over an area of the seabed around the boat, i.e., the depth directly under the keel, and also the depth in front of the boat.

Figure 5B:
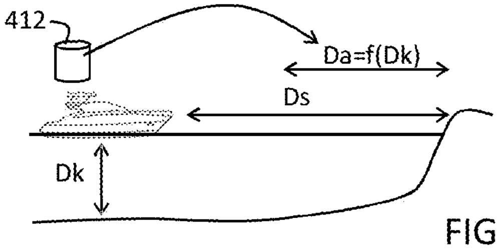

The boat has a digital storage medium 412 where a predetermined relationship between keel depth and preferred distance from land for dropping anchor is stored. In FIG. 5B the anchor assist system consults this relationship in order to determine a suitable distance Da from land (or a suitable range of distances from land) for dropping the anchor. The suitable distance Da is determined as a function of keel depth, i.e., Da=f(Dk), and may also comprise other aspects such as environment characteristics, anchor type, weather, and anchor dragging distance as discussed above.

Figure 5C:
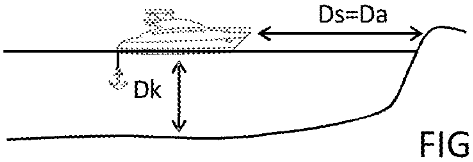

In FIG. 5C, the boat has reached a distance Ds from land corresponding to the preferred anchoring distance from land Da, and the anchor is therefore dropped.

Figure 5D:
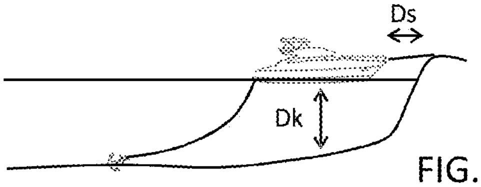

The boat then proceeds towards land, whereupon the bow line can be secured, as illustrated in FIG. 5D.

According to some aspects, the control unit 410 on the boat is arranged to receive a force signal from a force sensor arranged in connection to the anchor rode or anchor windlass of the boat or the anchor windlass, and to determine when the anchor has acquired sufficient hold at the bottom based on the force signal. The force sensor may, e.g., be a load cell or the like that is configured to measure a pull on the anchor rode, or a linear position transducer arranged to measure an extension of a resilient member attached to the anchor rode such as a spring or the like. The force signal after anchoring can be compared to an acceptance criterion, and the anchoring hold can be evaluated based on if the force signal fulfils the acceptance criterion or not. The acceptance criterion can be just a threshold or some more advanced criterion indicative of an acceptable anchor hold.

The control unit 410, receiving the force signal, can also be arranged to validate an anchor hold based on the force signal, and to trigger an action in case the force signal does not satisfy the acceptance criterion. For instance, if a forward thrust is performed and the force signal does not rise high enough, it may be assumed that insufficient anchor hold has developed, in which case the control unit may disqualify the anchor hold. The anchor maneuver may then be repeated to improve the anchor hold, i.e., the anchor may be hoisted and dropped again following a repositioning of the boat. The control unit 410 may also be arranged to perform an automated pull test on the anchor after anchoring. A pull test may, e.g., comprise automated generation of forward thrust and simultaneous monitoring of the force signal. The control unit can then validate the anchor hold in case the force signal in response to the forward thrust satisfies an anchor hold acceptance criterion, and invalidate the anchor hold otherwise.

The force signal can also be used to detect when the anchor has lost its hold. The control unit can for instance be arranged to trigger generation of an alarm signal in case the force signal drops below an expected anchoring force threshold, which can be determined based on wind and sea current conditions.

Figure 6:
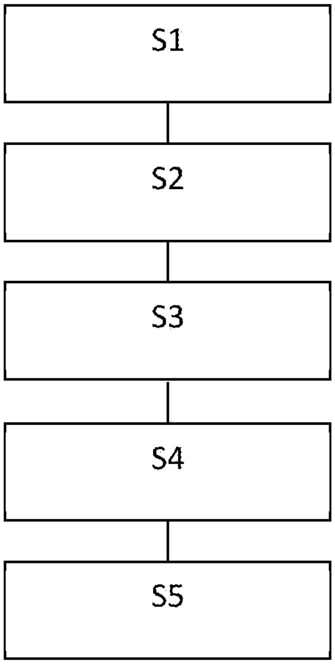
FIG. 6 is a flow chart illustrating methods.

FIG. 6 is a flow chart that illustrates a computer implemented method for automatically controlling at least part of an anchoring function of a marine vessel 110 by a control unit 410. The method comprises obtaining S1 a predetermined relationship between keel depth and preferred distance from land for dropping anchor, receiving S2 first sensor data 430 indicative of a current distance Ds between the marine vessel 110 and land 220, receiving S3 second sensor data 435 indicative of a current keel depth Dk of the marine vessel 110, determining S4 a suitable location and/or time period for dropping anchor based on the first sensor data 430, the second sensor data 435, and the predetermined relationship between keel depth and preferred distance from land for dropping anchor, and controlling S5 at least part of the anchoring function of the marine vessel 110 based on the determined suitable location and/or time period for dropping anchor.

Figure 7:
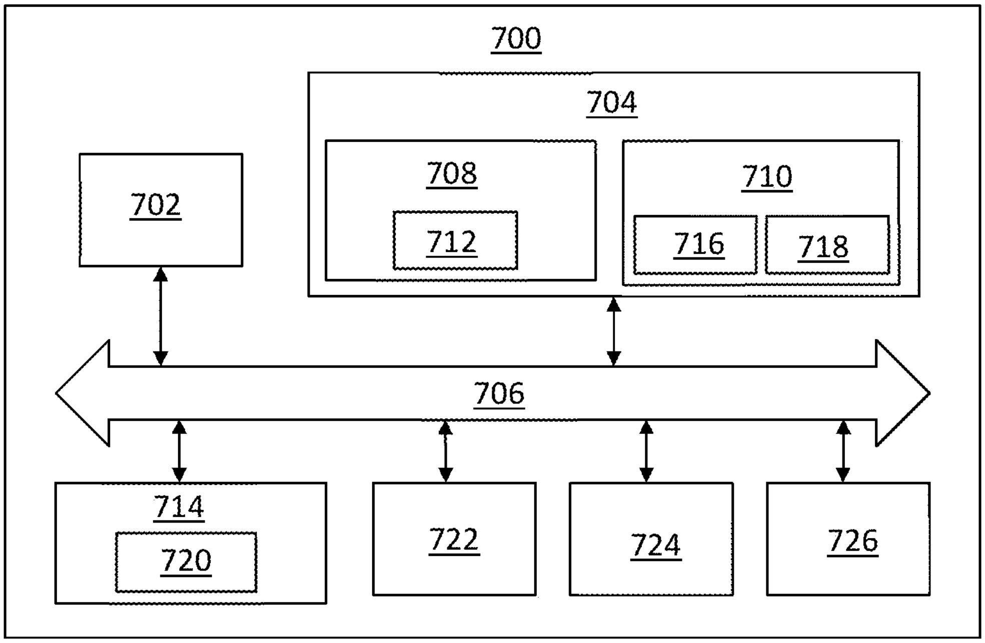
FIG. 7 illustrates a general control unit or computer system.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures, and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A control unit configured to automatically control at least part of an anchoring function of a marine vessel, the control unit comprising processing circuitry and a storage medium, where the control unit is arranged to obtain a predetermined relationship between keel depth and preferred distance from land for dropping anchor from the storage medium, where the control unit is arranged to receive first sensor data indicative of a distance between the marine vessel and land, where the control unit is arranged to receive second sensor data indicative of a keel depth of the marine vessel, where the control unit is arranged to determine a suitable location and/or time period for dropping anchor based on the first sensor data, the second sensor data, and the predetermined relationship between keel depth and preferred distance from land for dropping anchor, where the control unit is arranged to automatically control at least part of the anchoring function of the marine vessel based on the determined suitable location and/or time period for dropping anchor, and where the control unit is arranged to trigger generation of an anchoring signal at the suitable time period for dropping anchor and/or when the marine vessel enters within a predetermined first distance from the suitable location for dropping anchor.

2. The control unit according to claim 1, where the predetermined relationship is a function of present and/or expected water current, sea condition and/or wind condition at a location of the marine vessel.

3. The control unit according to claim 1, where the predetermined relationship is a function of seabed properties at the location of the marine vessel.

4. The control unit according to claim 1, where the predetermined relationship is configured to account for an anchor dragging distance indicative of a distance on the seabed along which the anchor is dragged before it acquires sufficient hold.

5. The control unit according to claim 4, arranged to monitor anchor dragging distance as function of anchoring location, and update the anchor dragging distance based on a current location of the marine vessel.

6. The control unit according to claim 1, where the first sensor data comprises data from a lidar and/or a radar sensor on-board the marine vessel.

7. The control unit according to claim 6, where the first sensor data comprises sea chart data aligned with the data from the lidar and/or the radar sensor.

8. The control unit according to claim 1, where the second sensor data comprises data from a sonar sensor on-board the marine vessel.

9. The control unit according to claim 8, where the sonar sensor on-board the marine vessel is arranged to generate a depth profile of the seabed over an area under the marine vessel.

10. The control unit according to claim 1, where the second sensor data comprises a position of the vessel obtained from a satellite positioning system, where the control unit is arranged to obtain depth information as function of position from the storage medium, and to determine the current keel depth based on the position of the vessel in combination with the depth information as function of position.

11. The control unit according to claim 1, where the control unit is arranged to trigger generation of an early notification signal a predetermined time period prior to the suitable time period for dropping anchor.

12. The control unit according to claim 1, where the control unit is arranged to trigger generation of an early notification signal when the marine vessel enters within a predetermined second distance from the suitable location for dropping anchor, where the predetermined second distance is larger than the predetermined first distance by a margin.

13. The control unit according to claim 1, where the anchoring signal is configured to trigger an automatic anchoring procedure by the marine vessel.

14. The control unit according to claim 13, where the automatic anchoring procedure by the marine vessel is conditioned on prior acknowledgement by an operator of the vessel.

15. The control unit according to claim 1, arranged to receive a signal from a manual input device, and to control at least part of the anchoring function of the marine vessel in response to receiving the signal from the manual input device.

16. The control unit according to claim 15, where the manual input device is a portable device arranged to be wirelessly connected to the control unit.

17. The control unit according to claim 1, arranged to receive a force signal from a force sensor arranged in connection to the anchor rode or anchor windlass of the marine vessel, and to determine when the anchor has acquired sufficient hold at the bottom based on the force signal.

18. The control unit according to claim 17, arranged to validate an anchor hold based on the force signal and on an anchor hold acceptance criterion, and to trigger an action in case the force signal does not satisfy the anchor hold acceptance criterion.

19. The control unit according to claim 18, arranged to perform an automated pull test after anchoring, the pull test comprising a temporary generation of forward thrust and simultaneous monitoring of the force signal, where the control unit is arranged to validate the anchor hold in case the force signal in response to the temporary forward thrust satisfies the anchor hold acceptance criterion.

20. The control unit according to claim 17, arranged to trigger generation of an alarm signal in case the force signal drops below an expected anchoring force threshold.

21. A marine vessel comprising a control unit according to claim 1.

22. A computer implemented method for automatically controlling at least part of an anchoring function of a marine vessel by a control unit, the method comprising obtaining a predetermined relationship between keel depth and preferred distance from land for dropping anchor, receiving first sensor data indicative of a current distance between the marine vessel and land, receiving second sensor data indicative of a current keel depth of the marine vessel, determining a suitable location and/or time period for dropping anchor based on the first sensor data, the second sensor data, and the predetermined relationship between keel depth and preferred distance from land for dropping anchor, controlling at least part of the anchoring function of the marine vessel based on the determined suitable location and/or time period for dropping anchor, and triggering generation of an anchoring signal at the suitable time period for dropping anchor and/or when the marine vessel enters within a predetermined first distance from the suitable location for dropping anchor.

23. A non-transitory computer readable medium carrying a computer program comprising program code for performing the steps of claim 22 when said program code is run on a computer or on processing circuitry of a control unit.

* * * * *